UNITED STATES PATENT OFFICE.

RUDOLF LINKMEYER, OF HERFORD, GERMANY.

MANUFACTURE OF ARTIFICIAL THREAD FROM SOLUTIONS OF CELLULOSE.

No. 852,126.  Specification of Letters Patent.  Patented April 30, 1907.

Application filed March 29, 1905. Serial No. 252,633.

*To all whom it may concern:*

Be it known that I, RUDOLF LINKMEYER, a subject of the Emperor of Germany, residing at Herford, in the Empire of Germany, textile engineer, have invented certain new and useful Improvements in the Manufacture of Artificial Threads from Solutions of Cellulose, of which the following is a specification.

This invention relates to the manufacture of cellulose threads presenting a luster resembling that of silk and obtained by the solution of cellulose in a cupro-ammoniacal liquor and precipitation of the cellulose from its solution after this latter has been passed through small apertures.

It is known that cellulose cannot be dissolved directly in the state of concentration necessary for permitting of precipitation and a large number of processes are already in existence for the preparation of concentrated solutions. The greater number of these processes are complicated and are based upon the reactions of concentrated alkalies; they do not always give the desired result, the strong alkalinity of the solutions is detrimental to th ubsequent treatment of the threads and the thickness of these solutions renders their filtration difficult.

The present invention has for its object a process which permits of rendering cupro-ammoniacal solutions of cellulose directly utilizable for the precipitation of the cellulose in the form of threads, by a reduction of the proportion of ammonia that they contain.

It has been found that it is possible to extract from a cellulosic cupro-ammoniacal solution a very large part of its ammonia, without any precipitation of the dissolved cellulose taking place, and this may be explained, if we admit that the ammonia is partially liberated by the fact of the dissolution itself. This extraction of the ammonia may be effected by suction by creating a vacuum above the solution and agitating the mass so as to facilitate the liberation of the gas; or this separation may be effected in contact with the air, by mixing the mass and in injecting into it, for example, a current of air.

The exactness of the assumption that a portion of the ammonia is liberated as a result of the dissolution of the cellulose, would appear to be demonstrated by the fact that if in a very complete vacuum a bath of ammoniacal oxid of copper is freed from all the ammonia not combined with the oxid of copper, cellulose then being dissolved therein, it is found, upon re-establishing the vacuum above the bath, that large quantities of ammonia gas are again liberated.

Hitherto, in the ammoniacal oxid of copper processes, the whole of the ammonia has been left in the solution of cellulose in order to subsequently precipitate it in the form of a salt corresponding to the acid employed, when it was desired to solidify the threads. The recovery of the ammonia contained in these salts (mostly acid) mixed with salts of copper, occasioned great expenditure and necessitated the employment of special processes for again liberating this ammonia. In the present process, this ammonia is in great part collected, in a gaseous state and chemically pure, by simple suction; it is therefore possible to immediately redissolve it in water. If it is considered that, in order to dissolve 1000 grams of cellulose, about 3000 to 3500 grams of ammonia are required, and further that, as a result of losses, there are used with the processes hitherto employed about 4500 grams of ammonia per kilogram of artificial thread, it will be obvious that the present process is of great practical value.

After the elimination of the uncombined ammonia, the solution is capable of being drawn into threads which solidify very rapidly in air. These threads may therefore be treated in various ways in order to convert them into threads of artificial silk.

What I claim and desire to secure by Letters Patent of the United States is:—

1. A process for the preparation of cupro-ammoniacal solutions of cellulose for the purpose of manufacturing artificial threads, consisting in withdrawing from these solutions a portion of their ammonia before converting them into threads.

2. A process for the preparation of cupro-ammoniacal solutions of cellulose for the purpose of manufacturing artificial threads, consisting in extracting from these solutions the ammonia contained therein in an uncombined state.

3. A process for the extraction of ammonia from a cupro-ammoniacal solution of cellulose, consisting in creating a vacuum above the solution and extracting the ammonia by suction.

4. A process for the extraction of ammonia from a cupro-ammoniacal solution of cellulose, consisting in creating a vacuum above the solution, stirring or mixing this latter and extracting the ammonia by suction.

In testimony whereof I have hereunto set my hand in presence of two subscribing witnesses this 14th day of March 1905.

RUDOLF LINKMEYER.

Witnesses:
R. V. V. KIRKPATRICK,
J. V. KIRKPATRICK.